United States Patent [19]

Pardoe

[11] Patent Number: 4,543,719

[45] Date of Patent: Oct. 1, 1985

[54] SHEAR APPARATUS

[76] Inventor: Raymond Pardoe, Bott La., Lye, West Midlands, United Kingdom

[21] Appl. No.: 505,015

[22] Filed: Jun. 16, 1983

[30] Foreign Application Priority Data

Jun. 19, 1982 [GB] United Kingdom ............... 8217842

[51] Int. Cl.⁴ ............................................. B23P 19/00
[52] U.S. Cl. ........................................ 30/134; 30/228; 30/229; 83/609
[58] Field of Search ............... 30/124, 134, 228, 229; 83/608, 609

[56] References Cited

U.S. PATENT DOCUMENTS

| 1,035,096 | 8/1912 | Kraut | 83/608 X |
| 4,188,721 | 2/1980 | Ramun | 30/231 X |
| 4,198,747 | 4/1980 | La Bounty | 30/134 |
| 4,217,000 | 8/1980 | Watanabe | 144/34 E |
| 4,376,340 | 3/1983 | Ramun et al. | 30/134 |
| 4,403,431 | 9/1983 | Ramun et al. | 30/134 |

Primary Examiner—Jimmy C. Peters

[57] ABSTRACT

A shear attachment is provided with fixing means so that it can be replaceably mounted in place of a bucket on the end of an arm of an excavator, the attachment comprising a pair of co-operating shearing jaw members, one of which is attachable to the arm of the excavator and carries a piston and cylinder device for actuating the other jaw member.

3 Claims, 4 Drawing Figures

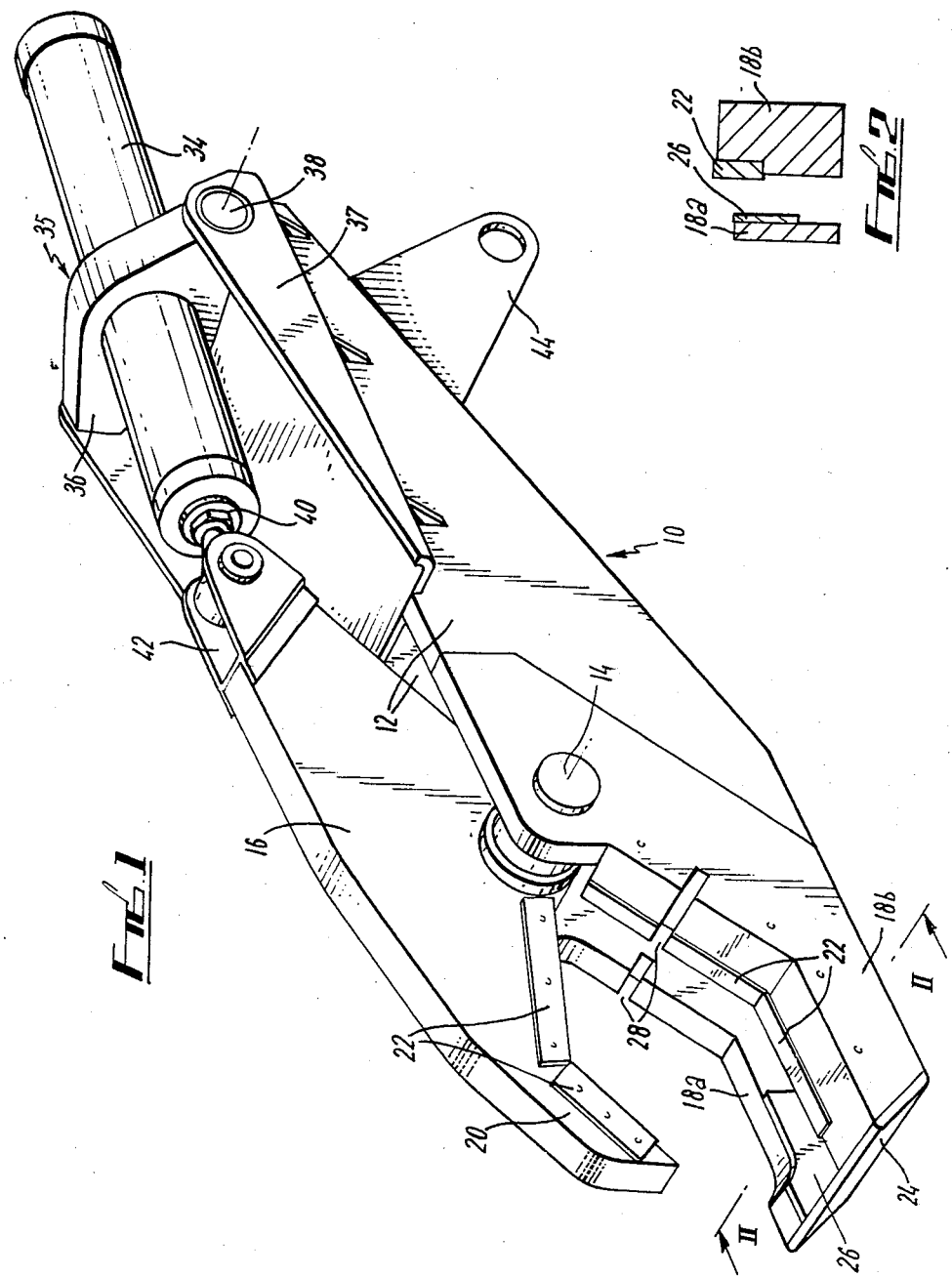

SHEAR APPARATUS

The invention relates to apparatus for shearing or cutting tough materials, such as metals, particularly but not exclusively steel, the apparatus being mounted in use on a hydraulically-powered arm of an excavating vehicle. The term "excavating vehicle" as used herein means a vehicle having wheels or which is track-laying having an arm of one or more articulated portions, said arm being powered wholly or partially by hydraulic power and usually having mounted at an extremity of the arm a bucket for earth excavation or some other tool for example a pneumatic or hydraulic percussion device or means for manipulating objects such as telegraph poles, posts and the like.

It is known to provide an arm on an excavating vehicle having a scrap shear provided thereon, the scrap shear being a part of the arm and not being transferable to another vehicle. Such shears have been expensive and because they have incorporated at least two and often more hydraulic rams to hold the scrap and cut it, they are extremely heavy requiring a large vehicle for stability.

The present invention seeks to provide a lightweight simple shear for attachment to and transfer between existing vehicles yet which is powerful enough to cut substantial thicknesses of material. The invention also seeks to provide a vehicle having fitted thereto such a shear.

The invention provides therefore a shear attachment adapted for attachment to an arm of an excavating vehicle, comprising a first member having a jaw on an end thereof and having remote from said jaw fixing means by which the first member may be mounted on the said arm, a second member movably mounted on said first member and having a jaw co-operable with the jaw of said first member, and an hydraulic piston and cylinder assembly mounted on one of said first and second members and connected to the other of said first and second members and operable to cause relative shearing movement between said jaws.

Preferably the second member is pivotally mounted on the first member.

Desirably the jaw of the first member comprises a pair of spaced apart jaw elements, the jaw of the second member being movable, in use, into or out of the said space.

Extremities of each jaw element may be joined together by a reinforcing member.

Preferably at least one of said pair of jaw elements and the jaw of the second member are provided with blades of hardened steel by which cutting is accomplished.

In a preferred arrangement the pivot between the first and second member is located near the jaws and the jaws are so shaped that during shearing an object being sheared is urged by the jaws in a direction generally away from the extremities of the jaws and generally towards the said pivot. To effect this, each jaw is preferably generally shaped so that the space between the jaws, as they initially meet, is wider towards the pivot than it is at the tips of the jaws.

One or both jaws may be provided with one or more grooves or recesses for gripping elements being sheared.

One of the jaw elements may be set back relative to the other jaw element in the direction of penetration of the jaw of the second member so that during shearing the said other jaw element comes into shearing co-operation with the jaw of the second member before the set back jaw element.

Preferably the cylinder of the piston and cylinder device is mounted for limited pivotal movement on the first member at a point between the ends of said member and the piston is pivotally connected at its end to the second member.

The fixing means desirably comprises a pair of pivotal mountings, one of said mountings being co-operable with the mounting provided on an arm of said vehicle which is usually fitted with an excavating bucket, the second of said mountings being co-operable with the mounting provided on the piston or cylinder of an excavating-bucket-tilting ram provided on said arm. A plurality of fixing means may be provided to allow the attachment to be transferred from one vehicle to another, different vehicle, having different fixings.

The hydraulic piston and cylinder device provided on the attachment is preferably driven by the hydraulic compressor of the vehicle to which it is, in use, attached.

Preferably the first member is fabricated and a portion thereof remote from the jaws is hollow.

An embodiment of the invention will now be described by way of example only with reference to the accompanying drawings, in which:

FIG. 1 is a perspective view of a shear attachment;

FIG. 2 is a partial cross-section on line II—II of FIG. 1;

Figure 3:
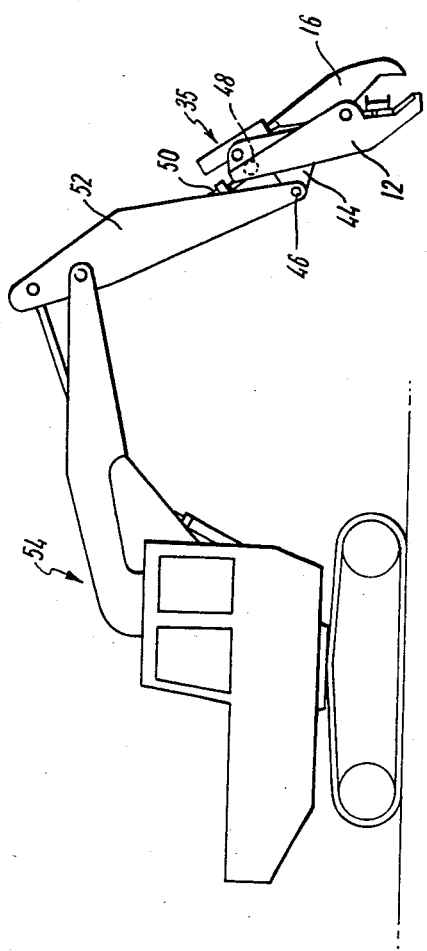
FIG. 3 is a schematic side elevation on a reduced scale of an excavating vehicle having fitted thereto a shear attachment according to the invention.

The attachment shown in the figures comprises a first member 10 comprising two frame members 12 assembled such that at their forward ends they are in spaced relationship with a gap therebetween. The rear portions of the members 12 are conveniently manufactured from a material whose thickness is less than said forward ends, for weight reduction purposes, and are assembled together with cross plates to form a hollow box structure. A pivot 14 is provided between the forward ends of the frame members 12 and on this is mounted a second member 16. At a front region of the frame members 12 there are provided jaw elements 18a, 18b and a co-operating jaw 20 is provided at a front region of the second member 16. During cutting the jaw 20 is received between the jaw elements 18a, 18b. The cutting edges of the jaw elements 18a, 18b and the jaw 20 each comprise two mutually inclined sections so that in the open position shown in FIG. 1 the space between them increases initially toward the pivot and thus closes towards the pivot. One face of the jaw 20 and the corresponding face of one of the elements 18b of the first member are provided with replaceable blades 22 of hard material fixed by known means to the jaws. The mounting of the second member 16 on the pivot 14 is such that the member 16 can be adjusted laterally of the pivot axis towards or away from the element 18b.

At their forward end, the jaw elements 18a and 18b are joined together by a replaceable reinforcing plate 24 which serves to prevent wear of the jaw ends, for example when the jaws are moved amongst piles of scrap to find items to cut and to tie the elements together. The jaw element 18b having the blades 22 is the primary anvil jaw on the first member 10. The jaw element 18a is cut back as shown in FIG. 2 so that items to be cut engage and are sheared at the jaw element 18b the jaw element 18a during cutting, serving to inhibit the forcing apart laterally of the jaw element 18b and jaw 20 by movement of an item being cut into a plane parallel to and between the plane in which the jaw 20 moves. A thrust plate 26 is provided on the jaw element 18a to direct the jaw 20 between the jaw elements 18a and 18b and to inhibit the lateral movement as aforesaid.

The angular disposition of the cutting edges of element 18b and jaw 20 are such that when the edges come together at a point which progresses away from the pivot the angle between the cutting edges is of the order of 2°, that is the cutting edges are never parallel.

The jaw elements 18a and 18b are provided with recesses 28 (not shown in FIG. 3) to accept the flange of a channel section girder to be cut.

A cylinder 34 of a relatively short stroke hydraulic ram 35 is mounted by means of a beam 36 fixed to the cylinder between its ends for limited pivotal movement in a cradle 37 welded across the frame members 12, by means of trunnions 38. An end region of a piston 40 of the ram 35 is pivotally connected to a yoke 42 fixed to the second member 16 at one end thereof remote from the jaw 20. By adopting a short stroke cylinder and mounting it to the first member from a point between its ends the overall length of the shear is kept to a minimum and a fast operating cycle is achieved. The length of the piston 40 and the distance between the yoke 42 and the pivot 14 are carefully selected so that as the jaws arrive at a cutting position the piston is substantially tangential to the arc defined by the yoke 42 as the member pivots about the axis 14. This means that the maximum force is transmitted to the jaws at the time of critical cutting.

Fixing means are provided for the fixing of the attachment to an excavating vehicle, these comprising a yoke 44 (only part of which is shown in FIG. 1) by means of which the attachment is pivotally mounted on the pivot 46 of an excavating vehicle provided for the excavating bucket. A further pivotal mounting 48 (not shown in FIG. 1 and shown in broken line in FIG. 3) is provided between the frame members 12 at an end thereof remote from the jaw elements 18a, 18b, this mounting being coupled in use to the piston of a bucket tilting ram 50 provided on the arm 52 of an excavating vehicle 54.

Various modifications may be made within the scope of the invention. For example several sets of fixing means similar to the yoke 44 may be provided (if they do not interfere with the operation of the attachment).

The recesses 28 may be omitted or of a shape different to those shown in the figures. More than one recess may be provided in the jaw elements 18a, 18b or the jaw 20.

It should be realised that by providing the shear with its own jaw actuating ram and mounting this ram on the first member, rather than by utilising, say, the bucket operating ram of the excavator which is mounted on the excavator arm, a relatively compact, light weight and consequently inexpensive shear is provided in which all the shearing forces are resisted by the components of the shear and are not transmitted to the arm of the excavator.

The self-contained nature of the shear described above allows a further useful modification to be made.

Figure 4:
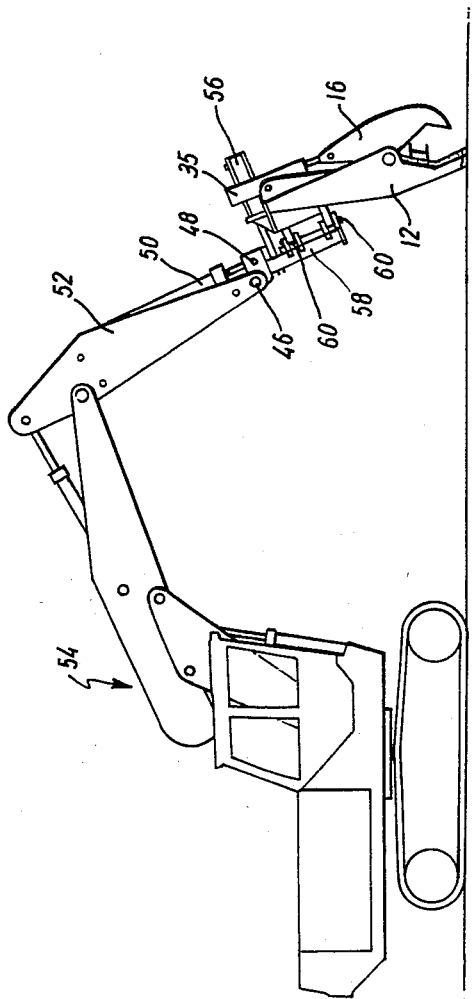
FIG. 4 is a view similar to FIG. 3, showing an excavating vehicle having a modified shear attachment fitted thereto.

In this modification, which is illustrated in FIG. 4, the shear is mounted on the arm 52 for pivotting about an axis transverse to the pivot axis of the jaws. The fixing means comprises a mounting plate 58 pivotally mounted on the arm by fixings 46, 48 and pivotally supporting the attachment or pivot pins 60 whose axes are parallel to the longitudinal axis of the arm. A further ram 56 is connected between the shear attachment and the plate 58 to cause pivotal movement about the mounting pins 60 when desired. This means that the operation of the jaws is not restricted to movement in a substantially vertical plane, the jaws can operate at any angle making the attachment particularly suitable for cutting in situ vertically orientated items, for example posts, columns and stanchions.

I claim:

1. A shear attachment adapted for attachment to an arm of an excavating vehicle, said shear attachment comprising:
   a. a first member having a first jaw on one end thereof and also fixing means remote from said jaw by which the first member may be mounted on the arm;
   b. a second member movably mounted on said first member about a first pivot axis and having a second jaw co-operable with the first jaw of said first member; and
   c. a hydraulic piston and cylinder assembly mounted on said first member about a second pivot axis and connected to said member about a third pivot axis and operable to cause relative shearing movement between said first and second jaws, wherein the cylinder of the piston and cylinder assembly is mounted for pivotal movement on the first member at a point between the ends of said cylinder.

2. A shear attachment adapted for attachment to an arm of an excavating vehicle, said shear attachment comprising:
   a. a first member having a first jaw on one end thereof and also fixing means remote from said jaw by which the first member may be mounted on the arm;
   b. a second member movably mounted on said first member about a first pivot axis and having a second jaw co-operable with the first jaw of said first member; and
   c. a hydraulic piston and cylinder assembly mounted on said first member about a second pivot axis and connected to said member about a third pivot axis and operable to cause relative shearing movement between said first and second jaws, said pivot axes being so positioned that as the first and second jaws close, a line parallel to a line joining the first and second pivot axes and on which the third pivot axis lies, moves away from the line joining the first and second pivot axes thereby increasing the level arm of the jaws whereby shearing forces are increased as the jaws move together, wherein the cylinder of the piston and cylinder assembly is mounted for pivotal movement on the first member at a point between the ends of said cylinder.

3. A shear attachment according to claims 1 or 2, wherein said first jaw includes a through recess therein for receiving said second jaw during relative shearing movement between said first and second jaws.

* * * * *